United States Patent
Sfar

(10) Patent No.: US 8,437,767 B2
(45) Date of Patent: May 7, 2013

(54) APPARATUSES, METHOD AND COMPUTER PROGRAM FOR ADAPTING A TELECOMMUNICATION SERVICE TO TRAFFIC LOAD IN THE NETWORK

(75) Inventor: Safouane Sfar, Le Mans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/386,690

(22) PCT Filed: Jul. 22, 2010

(86) PCT No.: PCT/EP2010/060673
§ 371 (c)(1),
(2), (4) Date: Jan. 24, 2012

(87) PCT Pub. No.: WO2011/012537
PCT Pub. Date: Feb. 3, 2011

(65) Prior Publication Data
US 2012/0129541 A1    May 24, 2012

(30) Foreign Application Priority Data
Jul. 28, 2009  (EP) ..................................... 09166598

(51) Int. Cl.
*H04Q 7/20*  (2006.01)
(52) U.S. Cl.
USPC ...... 455/452.1; 455/509; 455/450; 455/452.2
(58) Field of Classification Search .................. 455/509, 455/450, 452.1, 452.2
See application file for complete search history.

(56) References Cited

U.S. PATENT DOCUMENTS

| | | | |
|---|---|---|---|
| 6,671,732 B1 * | 12/2003 | Weiner | 709/231 |
| 2005/0272438 A1 * | 12/2005 | Holur et al. | 455/452.2 |
| 2006/0120321 A1 * | 6/2006 | Gerkis et al. | 370/329 |

OTHER PUBLICATIONS

International Search Report in corresponding International Application No. PCT/EP2010/060673 mailed Sep. 6, 2010.
Written Opinion in corresponding International Application No. PCT/EP2010/060673 mailed Sep. 6, 2010.
European Telecommunications Standards Institute; "Digital cellular telecommunications system (Phase 2+); Universal Mobile Telecommunications System (UMTS); General Packet Radio Service (GPRS); Service description; Stage 2; (3GPP TS 23.060 version 8.5.1. Release 8)"; GSM, Global System for Mobile Telecommunications; ETSI TS 123 060 V8.5.1 (Jun. 2009); XP014044520; pp. 1-280; Sophie-Antipolis, France.
European Telecommunications Standards Institute; "LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8)"; XP014044751; LTE, ETSI TS 136 300 V8.9.0 (Jul. 2009); pp. 1-163; Sophie-Antipolis, France.

* cited by examiner

*Primary Examiner* — Kwasi Karikari
(74) *Attorney, Agent, or Firm* — Potomac Patent Group PLLC

(57) ABSTRACT

There is disclosed improvements of the access stratum layer for adapting a telecommunication service to traffic load on the network.

15 Claims, 3 Drawing Sheets

FIG.1.
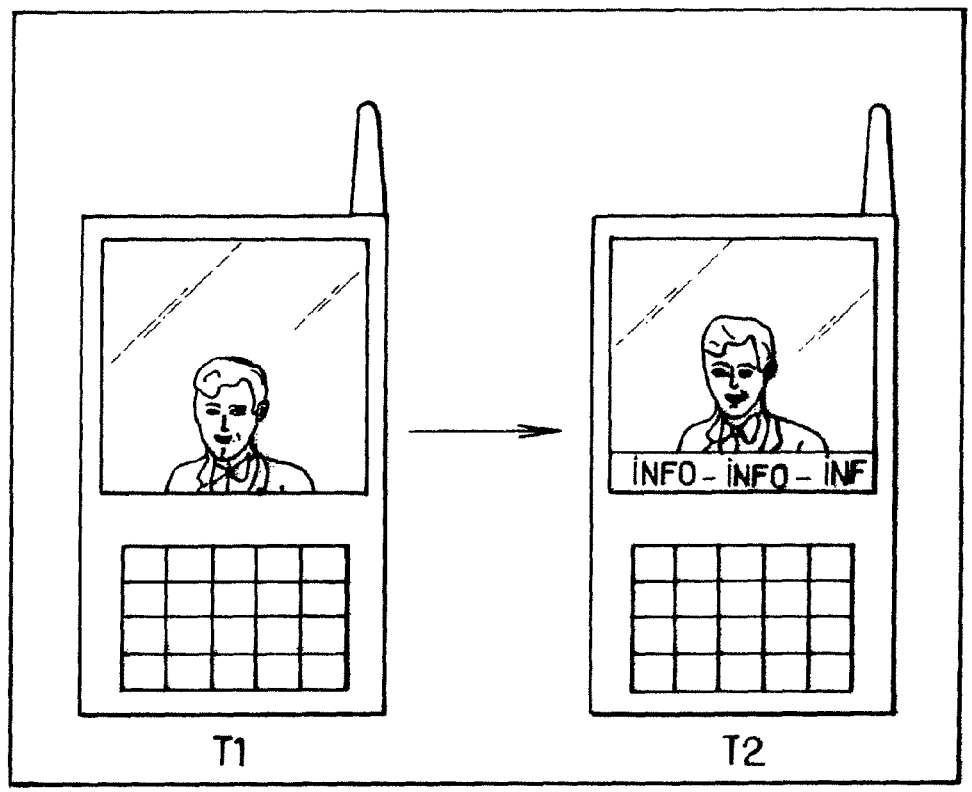
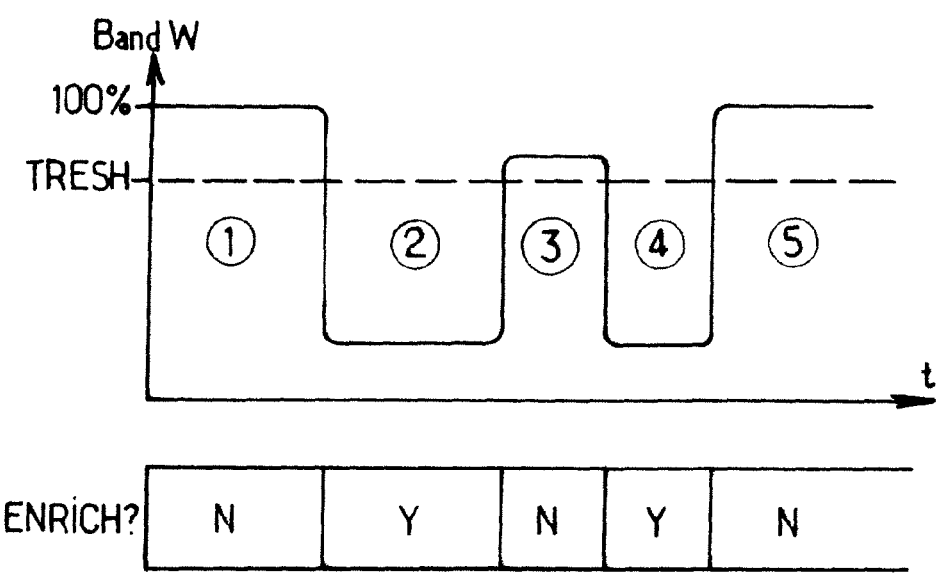
FIG.2.

APPARATUSES, METHOD AND COMPUTER PROGRAM FOR ADAPTING A TELECOMMUNICATION SERVICE TO TRAFFIC LOAD IN THE NETWORK

TECHNICAL FIELD

The present invention relates to improvements in the interactions between mobile communication terminals such as mobile phones and 3G networks, using a standard such as the 3GPP standard.

In particular, the present invention relates to improvements to the signalling between access controllers (AC) such as radio network controllers (RNC) of UMTS networks or eNodeB of LTE (Long Term Evolution) networks and mobile communication terminals or other controlling units of the Network.

The present invention has applications in integrated circuits of access controllers (AC).

BACKGROUND OF THE INVENTION

Recently, the IP Multimedia Subsystem (IMS) has been introduced in the fifth release of the 3GPP standard specification.

The IMS enables the core network entities to support real-time voice and multimedia services. The IMS architecture is based on the Internet Protocol (IP) and IP is used in both of the wire network and the air interface.

PRIOR ART

With Access stratum specifications as defined today by the 3GPP organism for UMTS networks and LTE networks, there is a lack of adaptation between these specifications and the IMS specificities related to quality of service (QoS).

SUMMARY OF THE INVENTION

There is a need for improving communications between access stratum modules in order to enhance Multimedia Telecom Service in IMS. To that purpose there is provided a circuit for access controller configured for:
  controlling a communication ongoing over the network according to a first service offered over the network, using a first configuration of resources of the network;
  receiving a first information relating to the traffic load on the network;
  adapting, based on the traffic load, the first service into a second service; and
  transmitting a request to an access controller of the network, responsive to the adaptation of the first service, for assigning additional resources to the first configuration and/or decreasing resources of the first configuration so as to provide a second configuration adapted to the second service.

The information relating to the traffic load may comprise information relating to the bandwidth which is available over the network.

For example, the information relating to the bandwidth may comprise a quantitative value representing a state of the traffic load of the network, or a value representing an evolution of the state of the traffic load of the network.

For example, the service offered may comprise a voice communication, a video communication, a broadcasting of content such as an audio content, a video content or a textual content.

For example, the adaptation of the first service may comprise an enhancement of the service when the state of traffic load of the network is low or an impoverishment of the service when the state of traffic load of the network is high.

For example, the adaptation of the first service comprises broadcasting a supplemental content or stopping broadcasting a content of the first service.

For example, the adaptation of the first service may comprise modifying quality parameters of the communication. In embodiments of the invention quality parameters are identified by the Quality Class Identifier (QCI) as defined in the 3GPP standard specification. When the state of traffic load is high, services running for the ongoing communication may have their QCI parameters deteriorated, and when the state of traffic load is low, the services may have their QCI parameters improved, regarding to the class of executed service.

In embodiments of the invention, users of the communication network may have the choice of having their communication adapted or not. In embodiments of the invention, the first service is offered by a content provider server and the circuit may be further configured for transmitting to the content provider server, responsive to the receipt of the first information, a request for adapting the first service into the second service.

For example, in order to modify the first configuration of the resources so as to adapt it to the second service,
  additional resources may be assigned, for example in order to support an increase in the amount of data transmitted during the ongoing communication, or
  resources may be decreased, for example when content in not broadcasted any longer, or
  a first set of additional resources may be assigned and a second set of resources may be decreased at the same time for performing a particular adaptation.

The resources may be decreased continuously or released step by step.

The resources may be hardware or software resources.

In embodiments of the invention, quality is not reduced and content broadcasting is not stopped when the traffic load on the network is lower than a first threshold.

The quality may be reduced and content broadcasting may be stopped when the traffic load on the network is comprised between the first threshold and a second threshold higher than the first threshold. The adaptation of the first service may be applied to a number of ongoing communications which is continuously increasing for example with the occupation of the bandwidth.

When the traffic load on the network is higher than the second threshold, quality reduction or content broadcasting stopping may be ceased. Hence, users who decided not to have their services adapted may use the network according to their choice.

With present invention, the use of bandwidth is optimized.

Moreover, enhanced services may be offered to users of the network without modifying the structure of the network.

This results in better services offered to the users without additional costs for the service provider.

There is also provided an access controller comprising a circuit as described, a method for controlling such a circuit, and a computer program comprising instructions for executing such a method when the program is executed by a processor.

These objects provide at least the same advantages as those associated to the circuit.

Other advantages are obtained by features which are recited in the dependent claims attached hereto.

BRIEF DESCRIPTION OF THE DRAWINGS

Other features and advantages of the invention will become apparent from the following description of non-limiting exemplary embodiments, with reference to the appended drawings, in which:

FIG. 1 is a schematic illustration of a context of implementation of embodiments of the invention;

FIG. 2 is a schematic illustration of the possibility to enrich the service with the evolution of the bandwidth occupation;

DETAILED DESCRIPTION OF EMBODIMENTS OF THE INVENTION

Figure 3:
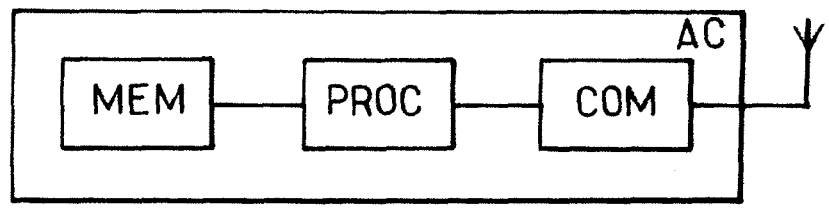
FIG. 3 is a schematic illustration of an access controller an AC according to embodiments of the invention.

FIG. 1 shows a terminal involved in a video communication. At time T1, the bandwidth available over the network on which the communication is ongoing is small. At time T2, the bandwidth available increases. This may be due to better traffic conditions over the network.

Thus, advantageously, the service used by the terminal may be enriched by supplemental content as illustrated on FIG. 1 at time T2. The quality of service (QoS) may also be increased. In addition to the video communication, the terminal thus receives, for example, textual information that is displayed on a screen of the terminal. The textual information may include local news, weather forecast information, advertisement or any other textual information.

The enrichment of the service or the increase of the quality of service may occur at different times, for example depending on the amount of traffic over the network.

In case the service is being enriched and the traffic conditions deteriorate, the service may be impoverished by stopping the broadcasting of textual information, for example. Besides, quality of service may be reduced.

FIG. 2 illustrates the possibility to enrich the service with the evolution of the bandwidth occupation.

In time periods 1, 3, and 5, the bandwidth is heavily occupied and enrichment or quality enhancement, are not possible. On the contrary, in time periods 2, and 4, the bandwidth is not much occupied and enrichment or quality enhancement, are possible. Indeed, the bandwidth occupation is below a threshold TRESH indicating a value of the bandwidth occupation above which enrichment or quality enhancement are not possible. Such a threshold may be determined by the person with ordinary skill in the art based on the technical characteristics of the network. This threshold may depend for example on traffic repartition between QCI classes, resource consumption of service execution which belongs to one QCI class, network dimensioning and planning or priority between services (between class of services).

Hence, according to the present embodiment, the service is enriched in time periods 2, and 4, while it is not enriched in time periods 1, 3, and 5. Besides, quality of service may also be adapted.

In the present embodiment of the invention, the network is an UMTS or a LTE network. The enrichment of the service is initiated by an access controller of the network. The controller controls the radio transmission of the base stations of the network. The controller also manages the radio resources, the encryption of data, and the mobile station localisation as it is known by the person with ordinary skills in the art.

Instead of enriching or impoverishing the service, or in addition to such an enrichment or impoverishment, quality of the service may be enhanced or reduced depending on the evolution of the traffic load on the network.

For example, each service that is provided over the network may be associated to a QCI value, as defined in the 3GPP standard. For example, conversational services may be associated to QCI values known as QCI1 and QCI2, streaming services may be associated to QCI values known as QCI3 and QCI4, and interactive services may be associated to QCI values known as QCI5 and QCI6.

Each QCI may define a particular combination of hardware or software resources to be used for the concerned service. For example, services associated to QCI4 may be allowed to use a given bandwidth while services associated to QCI5 may be allowed to use another and larger bandwidth. The QCI is a scalar that may be used as a reference for specific parameters that control packet forwarding such as scheduling weights, admission, queue management, link layer protocol configuration, etc. The parameters may be pre-configured by the network operator.

Figure 6:
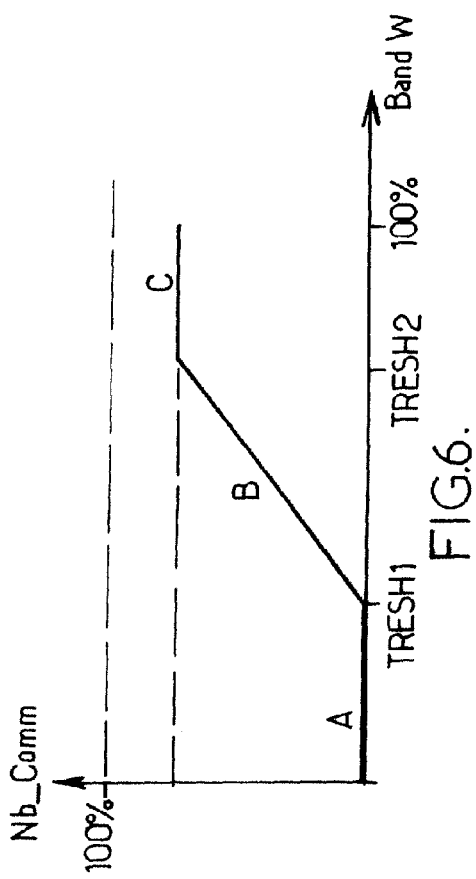
FIG. 6 is a schematic illustration of the number of communications which may potentially be adapted as a function of the traffic load on the network.

FIG. 6 shows the evolution of the number of services Nb_Comm adapted according to the bandwidth BandW available.

The evolution shows three different steps. In step A, no service is impoverished nor has its quality reduced. This illustrates the fact that under the traffic load threshold TRESH1, no service is altered.

For example, TRESH1 represents a state of load of the traffic below which there is no need to impoverish neither the content nor the quality of the services since there is enough bandwidth for all the ongoing communications.

In step B, traffic load exceeds TRESH1, and bandwidth gets too small for handling all the ongoing communications at the current quality of service or with the actual content. Hence, some of the communications have their quality reduced or have the service impoverished.

For example, the number of communications concerned is proportional to the bandwidth occupation. Also, a priority order may be defined in the ongoing communications for deciding which communication is to be altered.

For example, the communications concerned are initiated by users who subscribed to a service that comprises such a quality reduction or feature deactivation in exchange of a fee reduction.

In step C, traffic load exceeds a second threshold TRESH2 which is higher than TRESH1 and the quality reduction or content impoverishment is frozen. This is to allow a certain number of communications not to be altered. For example, these communications are those which are initiated by users which subscribed to a service that does not comprise quality reduction or feature deactivation.

For example, TRESH1 corresponds to 40% of bandwidth occupation and TRESH2 corresponds to 60% of bandwidth occupation. Other values may be used as it will be apparent to the person with ordinary skill in the art.

An access controller according to embodiments of the invention is shown in FIG. 3. The access controller AC shown in FIG. 3 comprises a communication unit COM for communicating over the network for example with base stations in UMTS network and management units of the network, a control unit PROC for operating the AC, and a memory MEM for storing data.

The control unit of the AC comprises a circuit that is configured for executing the steps of the method described below with reference to FIG. 4.

In step S40, the AC receives information on traffic load on the network.

This information is derivable by the AC by implementation of load balancing algorithms or/and Self Optimization Network (SON) algorithms detailed in the 3GPP specification.

Hence, AC may know for example whether there is available bandwidth which can be used for enriching the content of the telecom service or not. AC may also know whether bandwidth is getting too small for handling all the ongoing communications with the current QoS level.

Then, in case service enrichment is decided, in step S41, the AC transmits to a service provider, via the network, information indicating for example that there is bandwidth available. Upon receipt of this information, the service provider checks whether it can enrich the service or not. In case there is content to be broadcasted suitable for enriching the service, it transmits a message to the AC via the network, in step S42, for requesting the hardware and software resources to be reconfigured to receive supplemental data. For example the reconfiguration may consist in extending the size of the buffers for supporting a large amount of data.

In case, quality reduction is decided, in step S41, AC checks whether there are communications initiated by users which allow their communication to have its quality reduced. If there is such a communications, AC generates a new configuration for the communication which is of lower QoS.

The reconfiguration is then performed in step S42.

Figure 4:
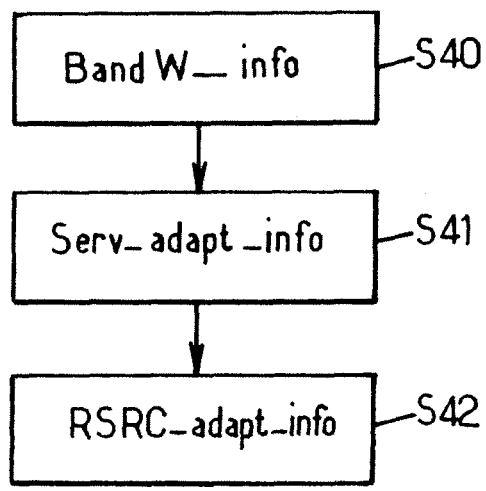
FIG. 4 is a flowchart of a method according to embodiments of the invention.

A computer program comprising instructions for executing the steps of the method described above may be designed based on an algorithm derived from the general flowchart depicted in FIG. 4.

Such a computer program may be stored in the memory MEM of the AC for its execution by the control unit PROC.

Figure 5:
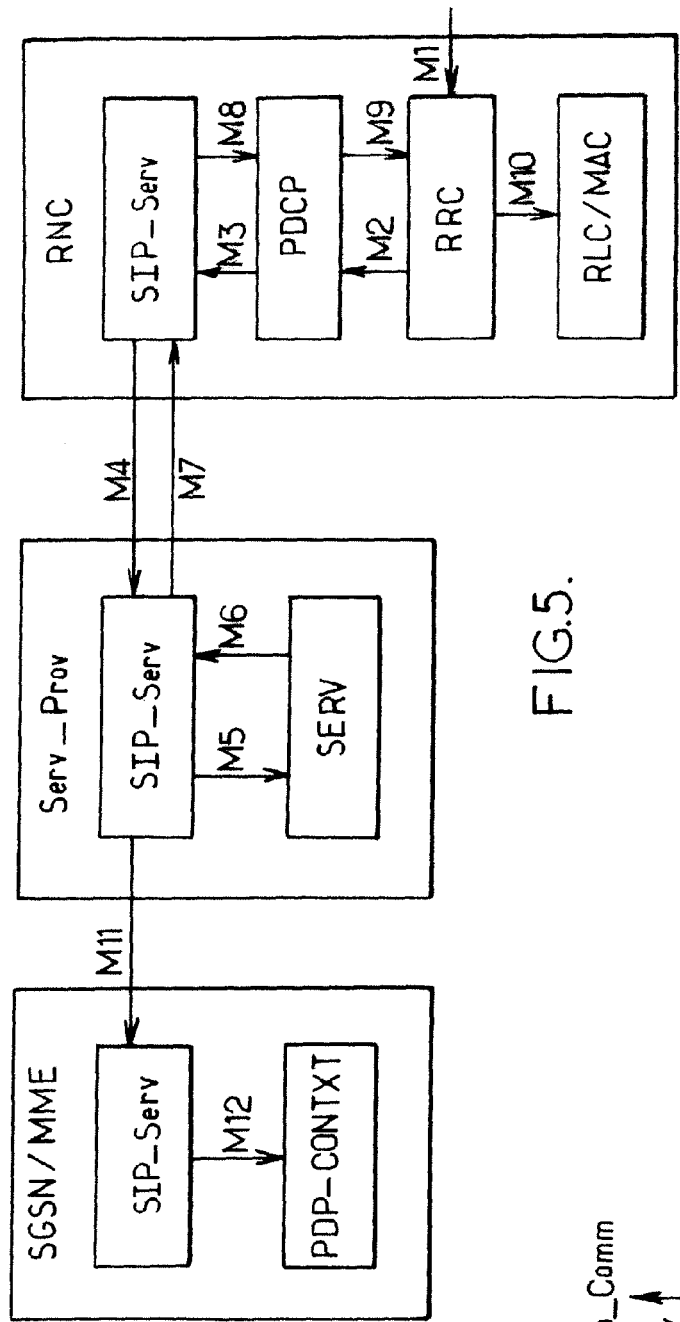
FIG. 5 is a schematic illustration of the transmission of data between the access controller AC and the service provider according to embodiments of the present invention.

Referring to FIG. 5 now, the transmission of data between the AC and the service provider will now be described in more details.

The AC is represented with the different protocol layers involved in the communication.

Firstly, the Radio Resource Control (RRC) layer receives message M1 containing information concerning the bandwidth available over the network.

Then, the RRC generates a message M2 and transmits it to the Packet Data Convergence Protocol (PDCP) informing that bandwidth is available for service enrichment.

The message is then transferred, in message M3, to the Session

Initiation Protocol Server SIP_Serv of the AC for transmission to the Service provider.

The communication between the AC and the Service provider is performed via the SIP servers of each of the AC and the service provider, by message M4.

Upon receipt of this message, the SIP server of the service provider transmits, in message M5, the information according to which there is for example a bandwidth available at the AC for service enrichment to the content managing unit SERV of the service provider.

Then SERV checks whether there is content to broadcast, in addition to the already offered services, or not.

In case there is content to broadcast, it transmits a request M6 for resource reconfiguration at the AC for handling the supplemental content. The parameters related to such reconfiguration may be found in the 3GPP standard specification.

The request is then transferred to the RRC of the AC via the SIP servers of the service provider and the SIP server of the AC and then via the PDCP (messages M7, M8, and M9).

Upon receipt of the request, the RRC transmits the adequate reconfiguration parameters to the PDCP, Radio Link Control (RLC) and the Medium Access Control (MAC) for performing the reconfiguration.

The RRC at the network side informs the RRC at the mobile communication terminal side (User equipment (UE) side) that the PDCP, RLC and MAC modules should be reconfigured at the UE side also.

A request M11 is also sent from the SIP server of the service provider to the SIP server of the SGSN (Serving GPRS Support Node) element in an UMTS network or of the MME (Mobility Management Entity) element in a LTE network, in order to reconfigure opened PDP (Packet Data Protocol) Context between the network and the User equipment for example with the new Quality of Service (QoS) class parameters (details for the reconfiguration may be found in the 3GPP specifications related to Core Network protocols). To that purpose, the SIP server transmits a message M12 to the PDP context management module PDP_CONTXT of the SGSN (or MME).

The SGSN element or the MME, requests Non Access Stratum NAS modules at the UE side to reconfigure the PDP Context (the details for the reconfiguration may be found in the 3GPP specifications related to Core Network protocols).

Messages M2, M3, M5, M6, M8, M9, M10 and M12 are defined by code implementation. These messages are internal to the service provider and the AC. The content of these messages and implementation details may be specified by the developers of these systems. Only the goal of these messages shall be detailed herein.

Messages M4, M7 and M11 may be SIP messages. The implementation of these messages may be achieved by using the SIP specification.

Messages M6, M7, M8, and M9 may be acknowledgement (ACK) or non acknowledgement NACK messages. For example, when RRC receives an (ACK) message which indicates that telecom service will be enriched, it may send message M10.

Messages M4, M7 and M11, may be based on SUBSCRIBE and NOTIFY requests as specified in the IETF document RFC 3265. These requests may be adapted to any embodiment of the invention, as it will be apparent to the person with ordinary skill in the art.

While the invention has been illustrated and described in details in the drawings and foregoing description, such illustration and description are to be considered illustrative and exemplary only, the invention being not restricted to the disclosed embodiments. Other variations to the disclosed embodiments can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A circuit for an access controller of a communication network configured for:
   controlling a communication ongoing over the network according to a first service offered over the network, using a first configuration of resources of the network;
   receiving a first information relating to the traffic load on the network;
   adapting, based on the traffic load, the first service into a second service; and
   transmitting a request to an access controller of the network, responsive to the adaptation of the first service, for assigning additional resources to the first configuration and/or decreasing resources of the first configuration so as to provide a second configuration adapted to the second service,
   wherein the adaptation of the first service is applied to a number of communications proportional to a bandwidth occupation, when said bandwidth occupation is greater than a first threshold, said number of communications being held constant when the bandwidth occupation exceeds a second threshold greater than said first threshold.

2. A circuit according to claim 1, wherein the first service is offered by a content provider server and wherein the circuit is further configured for:
   transmitting to the content provider server, responsive to the receipt of the first information, a request for adapting the first service into the second service.

3. A circuit according to claim 1, wherein the information relating to the traffic load on the network is adapted for indicating an increase or a decrease of traffic load on the network.

4. A circuit according to claim 1, wherein the adaptation of the first service comprises broadcasting a supplemental content or stopping broadcasting a content of the first service.

5. A circuit according to claim 1, wherein the adaptation of the first service comprises modifying a quality parameter of the ongoing communication.

6. A circuit according to claim 4, further configured for not reducing the quality nor stopping broadcasting content when the traffic load on the network is lower than a first threshold.

7. A circuit according to claim 6, further configured for reducing the quality or stopping broadcasting content when the traffic load on the network is comprised between the first threshold and a second threshold higher than the first threshold, the adaptation of the first service being applied to a number of ongoing communications which is continuously increasing with the traffic load.

8. A circuit according to claim 7, further configured for ceasing diminishing the quality parameter or stopping broadcasting content when the traffic load on the network is higher than the second threshold.

9. A circuit according to claim 1 wherein:
   the receipt of the information relating to the traffic load on the network,
   the transmission of the request for adapting the first service, and
   the transmission of the request for assigning additional resources to the first configuration and/or decreasing resources of the first configuration, are performed at the Radio Resource Control layer of the 3GPP standard specification.

10. A method for controlling a circuit, comprising:
    controlling a communication ongoing over the network according to a first service, using a first configuration of resources of the network;
    receiving a first information relating to the traffic load on the network;
    adapting, based on the traffic load, the first service into a second service; and
    transmitting a request to a resource controller of the network, responsive to the adaptation of the first service, for assigning additional resources to the first configuration and/or decreasing resources of the first configuration so as to provide a second configuration adapted to the second service,
    wherein the adaptation of the first service is applied to a number of communications proportional to a bandwidth occupation, when said bandwidth occupation is greater than a first threshold, said number of communications being held constant when the bandwidth occupation exceeds a second threshold greater than said first threshold.

11. A method according to claim 10, wherein the first service is offered by a content provider server and wherein the method further comprises:
    transmitting to the content provider server, responsive to the receipt of the first information, a request for adapting the first service into the second service.

12. A method according to claim 10, wherein the adaptation of the first service comprises broadcasting a supplemental content or stopping broadcasting a content of the first service.

13. A method according to claim 10, wherein the adaptation of the first service comprises modifying a quality parameter of the ongoing communication.

14. A computer program comprising instructions for implementing the steps of a method according to claim 10 when loaded and run on computer means of an access controller.

15. An access controller for a communication network comprising:
    a memory for storing a computer program according to claim 14;
    a control unit for running said computer program; and
    a circuit.

* * * * *